US006907249B2

United States Patent
Pinola

(10) Patent No.: US 6,907,249 B2
(45) Date of Patent: Jun. 14, 2005

(54) DYNAMIC CHANNEL CONFIGURATION OF CELLULAR RADIO NETWORK

(75) Inventor: Timo Pinola, Oulu (FI)

(73) Assignee: Nokia Networks Oy, Espoo (FI)

( * ) Notice: Subject to any disclaimer, the term of this patent is extended or adjusted under 35 U.S.C. 154(b) by 285 days.

(21) Appl. No.: 09/930,485

(22) Filed: Aug. 16, 2001

(65) Prior Publication Data

US 2002/0049061 A1 Apr. 25, 2002

Related U.S. Application Data

(63) Continuation of application No. PCT/FI00/00493, filed on Jun. 2, 2000.

(30) Foreign Application Priority Data

Jun. 4, 1999 (FI) .................................................. 991284

(51) Int. Cl.[7] ........................... H04Q 7/20; H04B 17/00
(52) U.S. Cl. ..................... 455/450; 455/67.11; 455/423; 455/452.1
(58) Field of Search ........................ 455/423, 447–448, 455/450, 424, 452.1, 452.2, 464, 509, 67.11, 67.13, 67.14, 560, 62; 370/329, 332, 337, 251, 252, 442, 437, 431, 458

(56) References Cited

U.S. PATENT DOCUMENTS

| | | | | | |
|---|---|---|---|---|---|
| 5,471,649 A | * | 11/1995 | Rees et al. | ................ | 455/67.14 |
| 5,551,064 A | * | 8/1996 | Nobbe et al. | ................. | 455/62 |
| 5,752,164 A | * | 5/1998 | Jones | ........................... | 455/454 |
| 5,930,707 A | * | 7/1999 | Vambaris et al. | ........... | 455/424 |
| 5,978,675 A | * | 11/1999 | Niemela | ...................... | 455/423 |
| 6,006,092 A | * | 12/1999 | Ward | .......................... | 455/438 |
| 6,198,925 B1 | * | 3/2001 | Lee | ............................. | 455/434 |
| 6,212,386 B1 | * | 4/2001 | Briere et al. | ................ | 455/447 |
| 6,223,031 B1 | * | 4/2001 | Naslund | ..................... | 455/423 |
| 6,308,065 B1 | * | 10/2001 | Molinari et al. | ........... | 455/424 |
| 6,445,916 B1 | * | 9/2002 | Rahman | ..................... | 455/423 |
| 6,480,718 B1 | * | 11/2002 | Tse | ............................ | 455/446 |

FOREIGN PATENT DOCUMENTS

| | | |
|---|---|---|
| WO | WO 96/34501 | 10/1996 |
| WO | WO 98/02010 | 1/1998 |
| WO | WO 98/14025 | 4/1998 |
| WO | WO 99/33297 | 7/1999 |
| WO | WO 00/01177 | 1/2000 |

* cited by examiner

*Primary Examiner*—Simon Nguyen
(74) *Attorney, Agent, or Firm*—Pillsbury Winthrop LLP

(57) ABSTRACT

A method for performing channel configuration of a base station in a cellular radio network, and a network element of the cellular radio network employing the method. In the method, the base station is directed by a controller controlling the base station to transmit a logical control channel on at least one physical channel allowed for the cellular radio network, a fixed receiver box is directed to receive the physical channel transmitted by the base station and to measure at least one channel parameter representing the properties of said physical channel, a measurement report on measurements made by the receiver box is transmitted to the controller, the controller selects on the basis of at least one measurement report at least one physical channel enabling good range, the base station is directed to use at least one physical channel enabling good range.

36 Claims, 7 Drawing Sheets

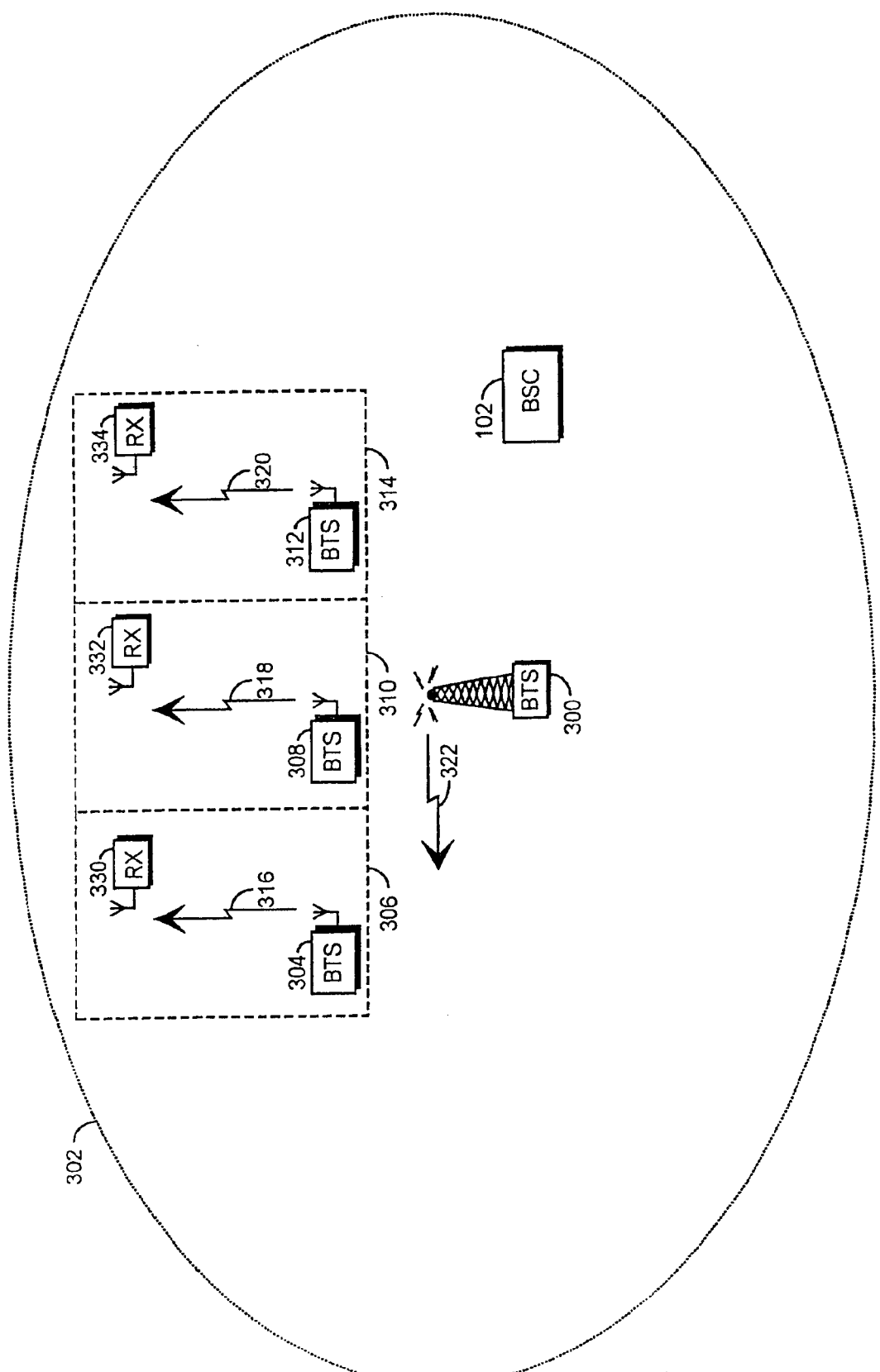

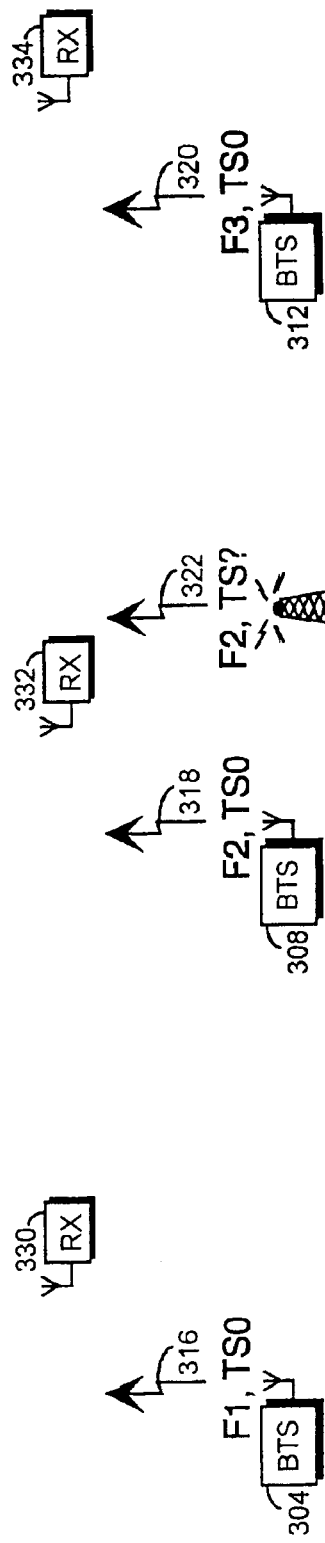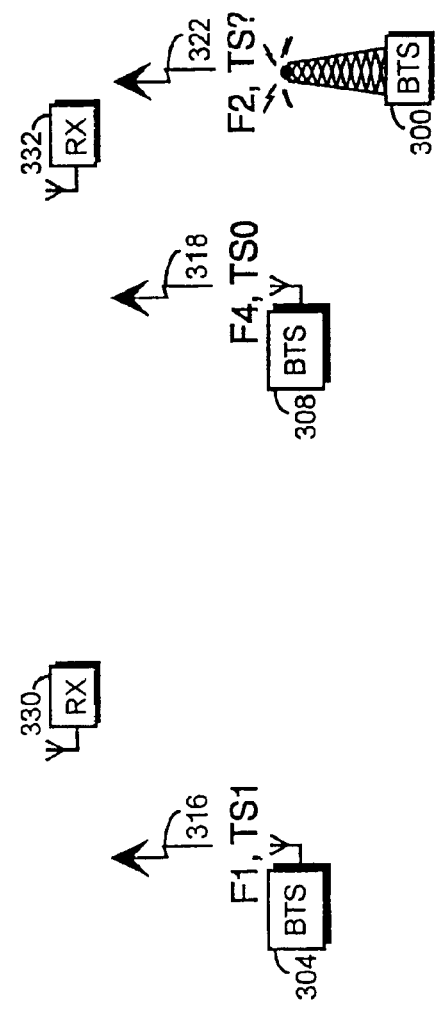

DYNAMIC CHANNEL CONFIGURATION OF CELLULAR RADIO NETWORK

This application is a Continuation of International Application PCT/FI00/00493 filed on Jun. 2, 2000 which designated the U.S. and was published under PCT Article 21(2) in English.

FIELD

The invention relates to a method for dynamically selecting the physical channels used by a base station, and to a cellular radio network employing the method.

BACKGROUND

In a cellular radio network, the size of cells may vary according to the predicted capacity requirement of an area, for instance. In a sparsely populated area, the cells often are large macro cells, whereas in population centres, the reuse of frequencies must be more efficient, which aim is reached by reducing the size of cells, i.e. by using micro or pico cells. The diameter of a pico cell is typically at most a few dozen meters, and its transmission power level is at most a few hundred milliwatts; the diameter of a micro cell is at most a few hundred meters, and its transmission power level at most a few watts, and the diameter of a macro cell is at most a few dozen kilometers, and its transmission power level at most a few dozen watts. Macro cells are typically used to cover large areas, a micro cell covers a multi-storey office building and its vicinity, for instance, and a pico cell covers an area of a few offices inside a building, for instance. The size hierarchy of cells can also have several levels, and the definitions of the names may vary, but the essential thing is that cells of various sizes can be placed on top of each other, if necessary.

It is difficult to configure physical channels of at least partly geographically overlapping cellular radio networks using various cell sizes, if for capacity reasons, the same channel area needs to be divided between various cellular radio networks. A situation where a cellular radio network comprising micro and/or pico cells and using the same channel area operates in the service area of a cellular radio network comprising macro cells and operating in a population centre, can be given as an example. In such a case, the channel configuration of the micro/pico cell radio network can be implemented using fixed channel allocation and the same channel space with the macro cell radio network, whereby the operation of the micro/pico cell radio network must be ensured by a careful channel planning so that the macro cell radio network which has a higher transmission power level does not cause too much interference.

Especially, when the channel allocation of the macro cell radio network changes, the operation of the micro/pico cell radio network must be ensured by a fast channel planning, channel configuration and operational testing. Today, the operation is checked by measurements performed manually by measurement personnel in the cells. This testing is slow and expensive, especially at night time or in regularly repeated measurements.

BRIEF DESCRIPTION OF THE INVENTION

It is thus an object of the invention to develop a method and an apparatus implementing the method so as to solve the above problems. This is achieved by the method disclosed in the following. It is a method for performing channel configuration of a base station in a cellular radio network. In the method, the base station is directed by a controller to transmit a logical control channel on at least one physical channel allowed for the cellular radio network; a fixed receiver box is directed to receive at least one physical channel transmitted by the base station and to measure at least one channel parameter representing the properties of said at least one physical channel; a measurement report on the measurements performed by the receiver box is sent to the controller; at least one physical channel enabling good range is selected in the controller on the basis of at least one measurement report; the base station is directed to use at least one physical channel enabling good range.

The invention also relates to a network element of a cellular radio network, comprising at least one base station and a controller controlling the base station. The network element also comprises at least one fixed receiver box comprising means for receiving control commands from the controller, means for measuring at least one channel parameter representing the properties of at least one physical channel, and means for sending a measurement report on the measurements performed by the receiver box to the controller; the controller also comprises means for directing the base station to transmit a logical control channel on at least one physical channel allowed for the cellular radio network, means for directing the fixed receiver box to receive at least one physical channel transmitted by the base station, means for selecting at least one physical channel enabling good range on the basis of at least one measurement report, and means for directing the base station to use at least one physical channel enabling good range.

Preferred embodiments of the invention are set forth in the dependent claims.

The invention is based on using special receiver boxes installed fixedly in cells. Remotely controlled use of the receiver boxes replaces manual measurements and the entire channel configuration operation, from planning to the actual configuration and its testing, can be automated.

The method of the invention and the apparatus employing the method provide several advantages. The method is less expensive and less susceptible to errors than manually performed measurements. After basic investments, the operating costs of the method are very small, i.e. it can be utilised whenever needed and even at regular intervals, thus improving the reliability of the network operation.

BRIEF DESCRIPTION OF THE FIGURES

In the following, the invention will be described in greater detail by means of preferred embodiments and with reference to the attached drawings in which FIG. 3A is an example of a cellular radio network of the invention, FIGS. 3H and 3I show another example of executing the method of the invention.

DESCRIPTION OF EMBODIMENTS

Figure 1:
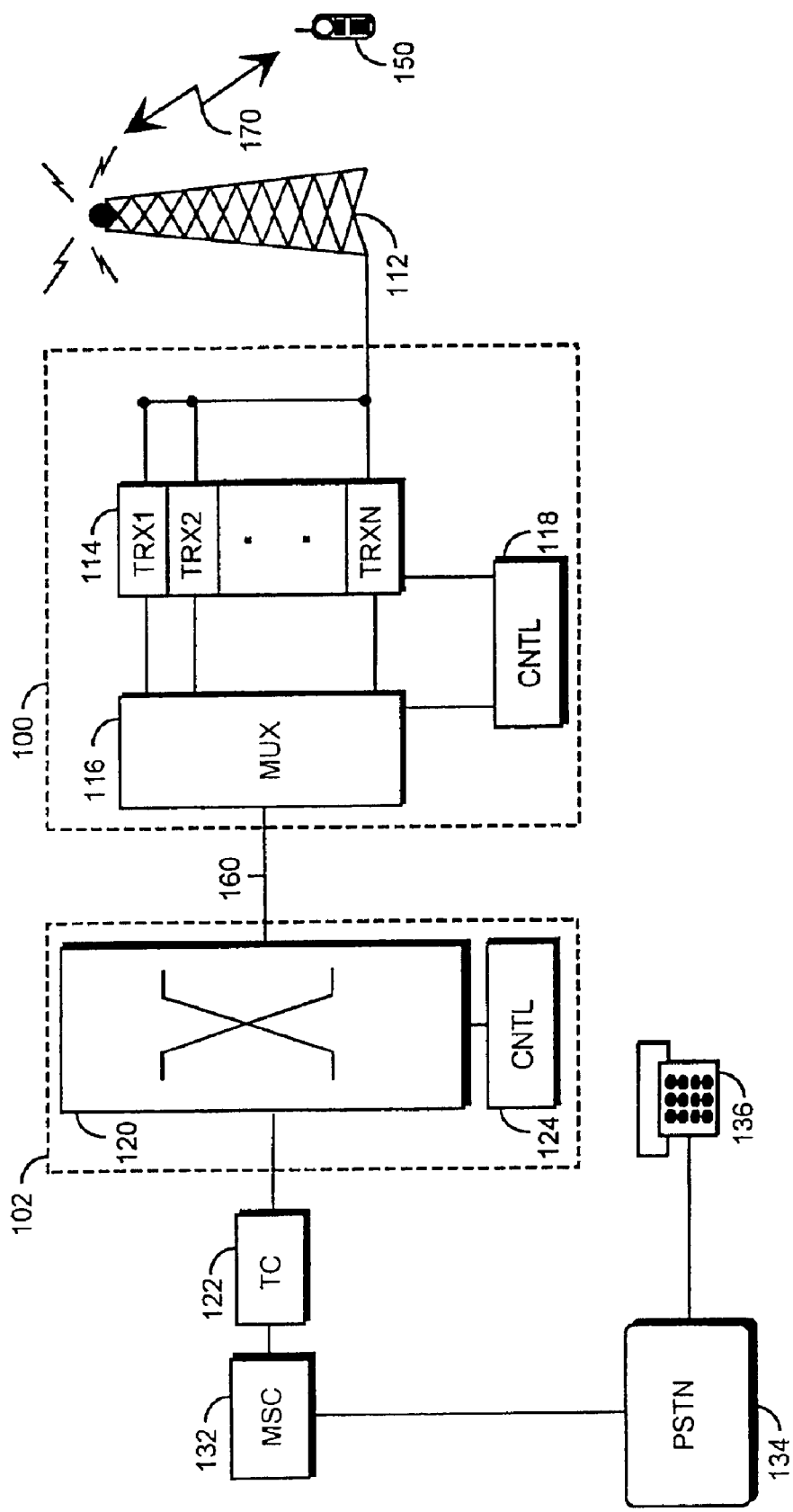
FIG. 1 is an example of the structure of a cellular radio network.

FIG. 1 shows a typical structure of a cellular radio network of the invention. FIG. 1 only contains the blocks essential for describing the invention, but it is obvious to a person skilled in the art that a conventional cellular radio network also comprises other functions and structures which need not be described in greater detail herein. The example describes a GSM cellular radio network employing TDMA (time division multiple access), without being limited to it, however. Thus, in the example, a physical channel refers to a frequency/time-slot combination, but in other types of systems, a physical channel can be implemented in another manner, for instance as a frequency/spreading code combination in a CDMA system (code division multiple access).

A cellular radio network typically comprises an infrastructure of a fixed network, i.e. a network element, and subscriber terminals 150 which can be fixed terminals, terminals installed in a vehicle, or portable terminals. The network element comprises base stations 100. A base station controller 102 connected to base stations controls several base stations 100 in a centralised manner. A base station 100 comprises transceivers 114. A base station 100 typically has one to sixteen transceivers 114. One transceiver 114 provides radio capacity for one TDMA frame, i.e. typically eight time-slots.

The base station 100 has a control unit 118 which controls the operation of the transceivers 114 and a multiplexer 116. The multiplexer 116 places the traffic and control channels used by several transceivers 114 on to one transmission link 160.

The transceivers 114 of the base station 100 are connected to an antenna unit 112 which implements a bi-directional radio link 170 to a subscriber terminal 150. The structure of the frames to be transmitted is specifically defined in a bi-directional radio link 170, too, and is called an air interface.

The subscriber terminal 150 can be a normal mobile phone, for instance, and a portable computer, for instance, can be connected to it by means of an expansion card, and the computer can then be used in ordering and processing packets in packet transmission.

Figure 2:
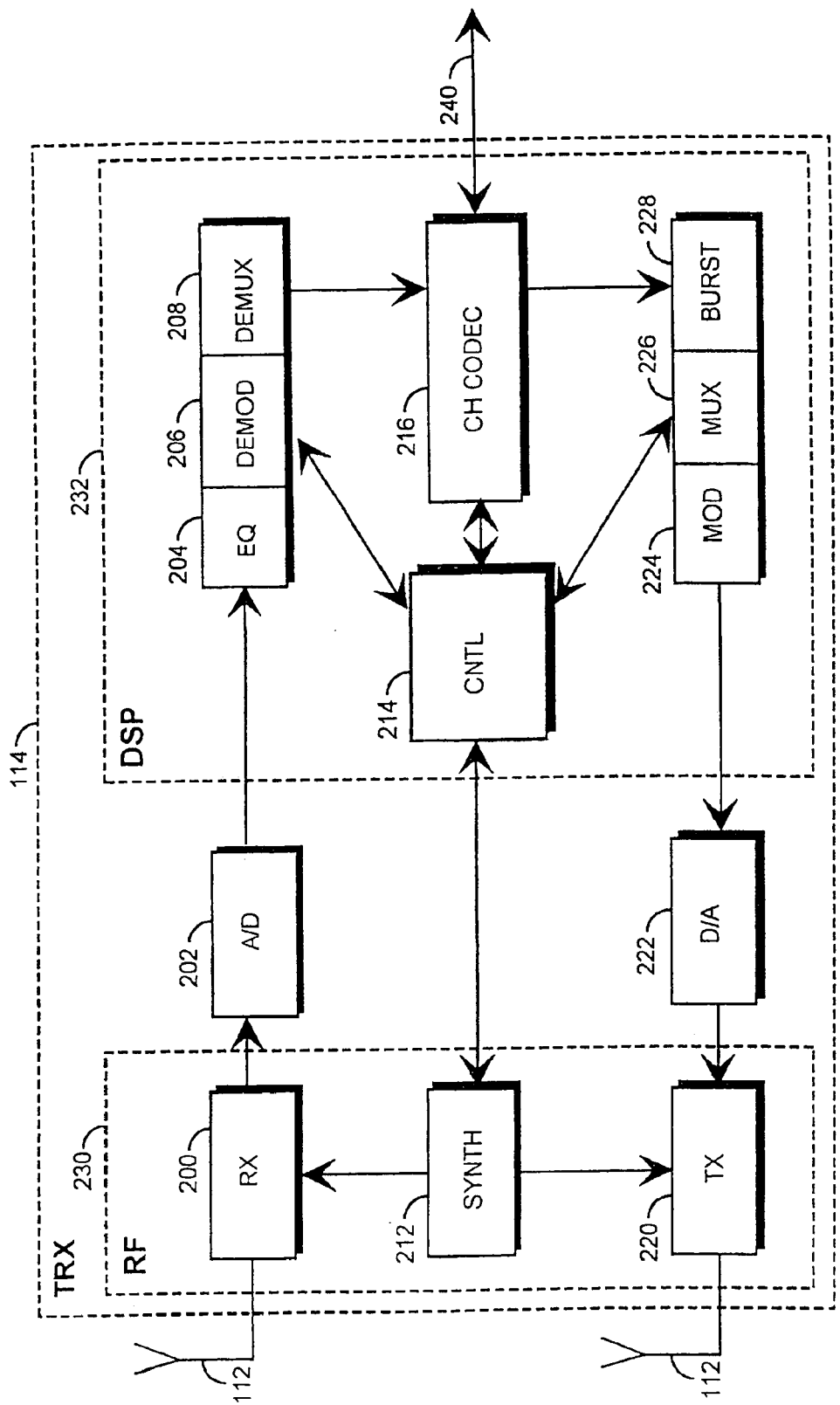
FIG. 2 shows the structure of a transceiver.

FIG. 2 shows in more detail the structure of one transceiver 114. A receiver 200 comprises a filter which prevents any frequencies outside the desired frequency band. The signal is then converted to an intermediate frequency or directly to base band, and the converted signal is sampled and quantized in an analogue-to-digital converter 202. An equalizer 204 compensates for any interference, such as that caused by multipath-propagation. A demodulator 206 generates a bit stream from the equalized signal and transmits it to a demultiplexer 208. The demultiplexer 208 demultiplexes the bit stream from different time-slots to its own logical channels. A channel codec 216 decodes the bit stream of various logical channels, i.e. decides whether the bit stream is signalling data which is transmitted to a control unit 214, or speech which is transmitted 240 to a speech codec 122 of the base station controller 102. The channel codec 216 also does error correcting. The control unit 214 performs internal control tasks by controlling the various units. A burst generator 228 adds a training sequence and a tail bit to the data received from the channel codec 216. A multiplexer 226 indicates each burst its time-slot. A modulator 224 modulates digital signals to a radio frequency carrier. This function is analogue and requires a digital-to-analogue converter 222. A transmitter 220 comprises a filter for limiting the bandwidth. In addition, the transmitter 220 controls the output level of the transmission. A synthesizer 212 arranges the required frequencies for various units. The clock inside the synthesizer 212 can be controlled locally or in a centralised manner from somewhere else, from the base station controller 102, for instance. The synthesizer 212 generates the required frequencies by means of a voltage-controlled oscillator, for instance.

The structure of the transceiver can in the manner described in FIG. 2 be divided into radio frequency parts 230 and a digital signal processor with its software 232. The radio frequency parts 230 comprise a receiver 200, transmitter 220 and a synthesizer 212. The digital signal processor with its software 232 comprises an equalizer 204, demodulator 206, demultiplexer 208, channel codec 216, control unit 214, burst generator 228, multiplexer 226 and modulator 224. Converting an analogue radio signal into digital requires an analogue-to-digital converter 202, and correspondingly to convert a digital signal to analogue, a digital-to-analogue converter 222 is required.

The base station controller 102 comprises a switching field 120 and a control unit 124. The switching field 120 is used to switch speech and data and to connect signalling circuits. The base station 100 and the base station controller 102 form a base station system which also comprises a transcoder 122. The transcoder 122 is usually located as close to a mobile switching centre 132 as possible, because speech can then be transmitted in cellular radio network format between the transcoder 122 and the base station controller 102, saving transmission capacity.

The transcoder 122 converts the various digital coding formats of speech used between the public telephone network and the radio telephone network to be compatible with each other, for instance from the 64 kbit/s format of a fixed network to another (e.g. 13 kbit/s) format of a cellular radio network and vice versa. The control unit 124 takes care of call control, mobility management, statistics collection and signalling.

The structure of the subscriber terminal 150 can be described utilizing the description of the structure of the transceiver 114 in FIG. 2. The structural parts of the subscriber terminal 150 are functionally the same as those of the transceiver 114. In addition, the subscriber terminal 150 has a duplex filter between the antenna 112 and the receiver 200 and the transmitter 220, as well as user interface parts and a speech codec. The speech codec is connected to the channel codec 216 through a link 240.

As seen in FIG. 1, the switching field 120 can be used to switch (black dots in figure) to the public switched telephone network 134 through the mobile switching centre 132. A typical terminal 136 in the public switched telephone network 134 is a conventional phone or an ISDN (integrated services digital network) phone.

FIG. 1 shows how a circuit-switched transmission link is set up between the subscriber terminal 150 and the public switched telephone network terminal 136. The line in the figure shows how data is transmitted through the system on the air interface 170, from the antenna 112 to the transceiver 114 and from there along the transmission link 160 multiplexed in the multiplexer 116 to the switching field 120 in which a switch has been set up to the output going to the transcoder 122, and onwards therefrom through the switch set up in the mobile switching centre 132 to the terminal 136 connected to the public switched telephone network 134. In the base station 100, the control unit 118 controls the multiplexer 116 in the transmission, and in the base station controller 102, the control unit 124 controls the switching field 120 in making the correct switch.

Figure 5:
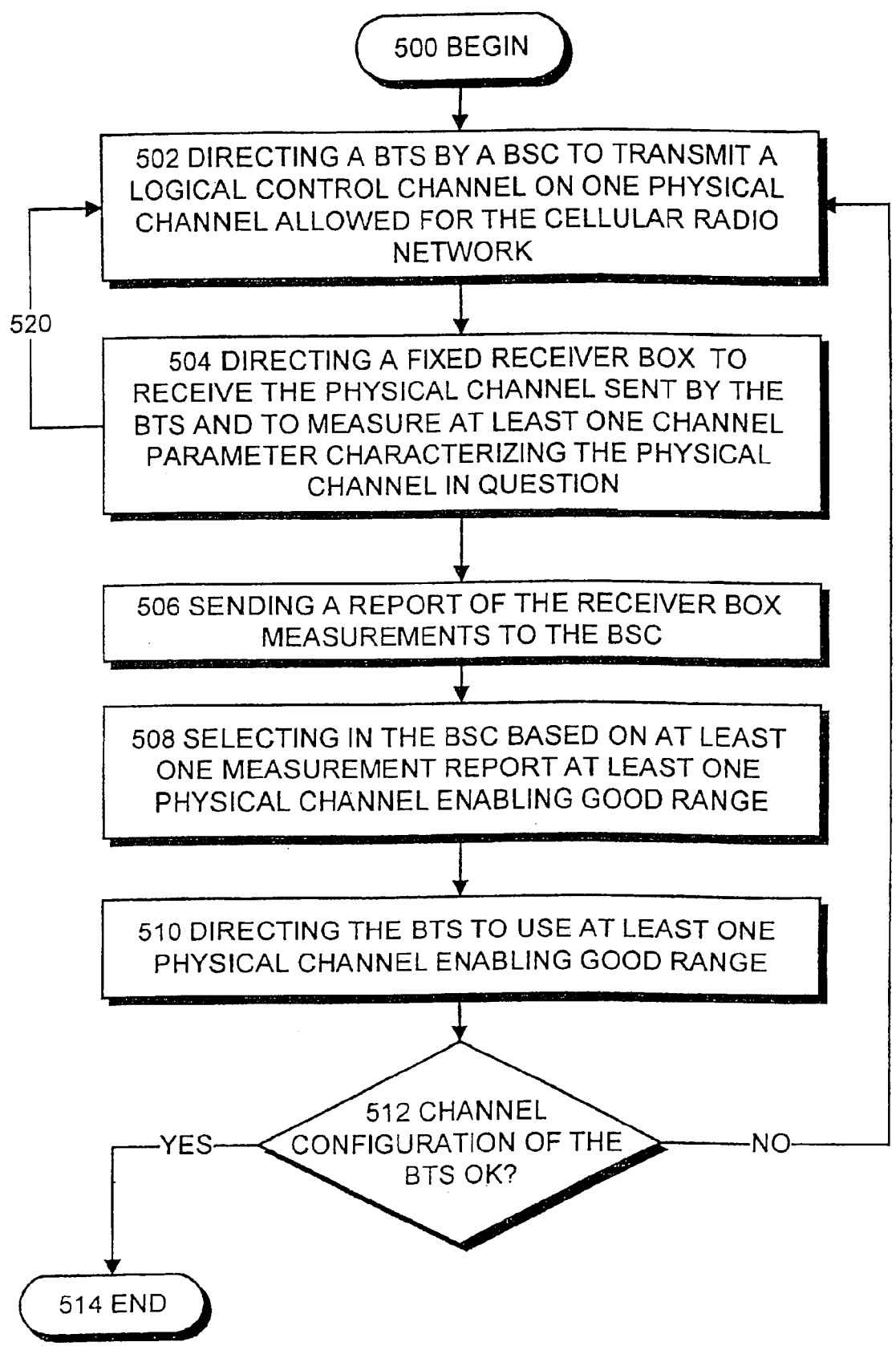
FIG. 5 is a flow chart illustrating the functions of the method of the invention.

Now, after describing an example of a system in which the invention can be employed, the following describes, with reference to FIG. 5, the method of the invention for channel configuring a base station 100 in a cellular radio network. The example of a cellular radio network of the invention shown in FIG. 3A is used to assist in the description. Here, it is enough to know that in said FIG. 3A, the base station 304 forms an indoor cell 306, and said indoor cell 306 contains a special receiver box 330 whose structure will be described in more detail later.

The execution of the method starts in block 500. In block 502, the controller 102 directs the base station 304 to transmit a logical control channel on at least one physical channel 316 allowed for the cellular radio network. The logical control channel is a BCCH (broadcast control channel), for instance. A physical channel allowed for a cellular radio network refers to the fact that the authorities have granted certain channels for the operator of the cellular radio network in question. It is then up to the operator to decide how the allowed channels are used, i.e. the operator must plan their use. In a GSM system, for instance, an operator receives a certain frequency range for use.

In block 504, the fixed receiver box 330 is directed to receive at least one physical channel 316 transmitted by the base station and to measure at least one channel parameter representing the properties of said at least one physical channel 316. The channel parameter describes the quality of the physical channel 316, for instance its receiving level, bit error ratio, carrier/interference ratio, signal/interference ratio or some other property, on the basis of which it is possible to determine the usability of the channel.

In block 506, a measurement report on the measurements made by the receiver box 330 is transmitted to the controller 102. The measurement report can contain basic data obtained from the channel parameter measurements, or the information can be pre-processed to some extent in the receiver box 330 to reduce the requirement for data transmission capacity.

In block 508, at least one physical channel 316 enabling good range is selected in the controller 102 on the basis of at least one measurement report. As described in block 502, the base station 304 can transmit the control channel on several different physical channels. This is illustrated in FIG. 5 by an arrow 520, along which the routine moves from block 504 to block 502 to transmit the next channel. The transmissions can be simultaneous in such a manner, for instance, that in a GSM system, a control channel is transmitted in all time-slots of a certain frequency, or the transmissions can be performed one after the other in such a manner, for instance, that in a GSM system, a control channel is first transmitted in the first time-slot of a certain frequency for one minute, for instance, and then in turns in each remaining time-slot of the frequency in question for one minute. The transmissions can naturally then be continued on another frequency, if necessary. It is also obvious that the measurement report can be transmitted after each measurement, or a measurement report can be transmitted after all measurements have been made. When a measurement report is transmitted immediately after each measurement, the procedure can be stopped as soon as a sufficient number of good enough physical channels have been selected. On the other hand, the data transmission need can be reduced by transmitting the measurement report after all measurements have been made and the measurement data has been pre-processed in the receiver box 330.

Next, in block 510, the base station 304 is directed to use at least one physical channel 316 enabling good range. The number of physical channels 316 naturally depends on the traffic capacity required by the base station 304. For instance, if it is assumed that the base station 304 is a GSM base station 304 using one transceiver and located indoors, then the need for capacity is 16 physical channels, i.e. all time-slots of one frequency for both downlink and uplink direction.

In block 512, a test takes place to see whether the channel configuration of the base station 304 is finished. If the channel configuration is finished, the routine moves to block 514 to end the execution of the method. If the channel configuration is not yet finished, the routine returns to block 502, in which the next channel(s) to be tested is selected. It is also possible to have a solution where the finished channel configuration is once more tested by means of the method of the invention, i.e. the routine returns to block 502, and only if the test is passed, the channel configuration becomes valid.

The presented channel configuration is typically performed when building a cellular radio network. The method is also executed after possible changes to or expansion of the network. Further, it is possible to execute the method at regular intervals to ensure the quality of radio transmissions. It is also possible to have an embodiment where the method is initiated, if a certain number of established connections, for instance a certain percentage during a certain period of time or on average, is broken or is too poor in quality.

In the above, the execution of the method is described with respect to one base station 304. Let us next expand the description to cellular radio networks. FIG. 3A shows two cellular radio networks. The part of the macro cell radio network shown in the figure comprises a base station 300 and a macro cell 302 it forms. A pico cell radio network is within the macro cell 302, comprising three base stations 304, 308, 312 and pico cells 306, 310, 314 formed by them. The physical radio channels of the macro base station 300 are illustrated by an arrow 322 in the figure. The physical radio channels of the pico base stations 304, 308, 312 are illustrated by arrows 316, 318, 320 in the figure. According to the invention, each pico cell 306, 310, 314 contains a receiver box 330, 332, 334.

Figure 3D:
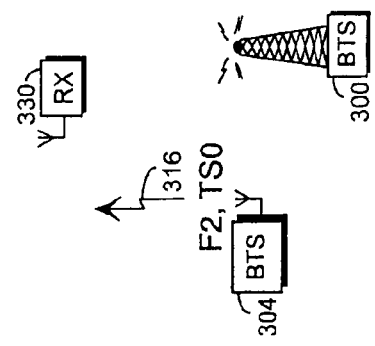
FIGS. 3B to 3G show an example of executing the method of the invention.
Figure 3G:
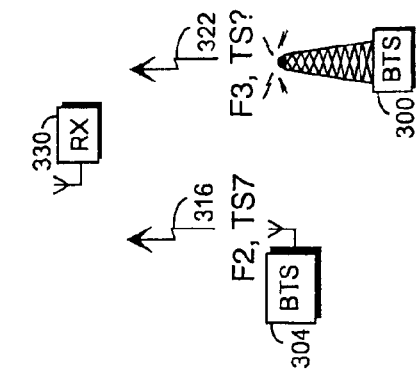
Figure 3C:
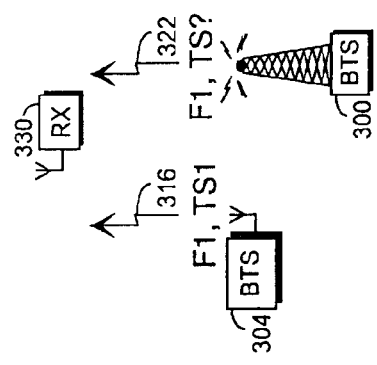
Figure 3F:
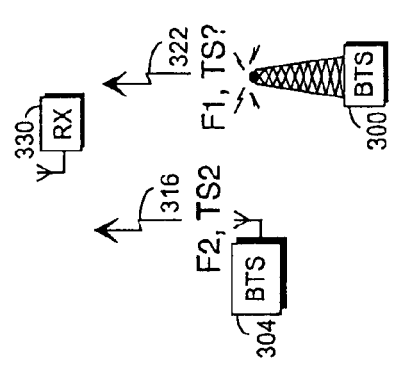
Figure 3B:
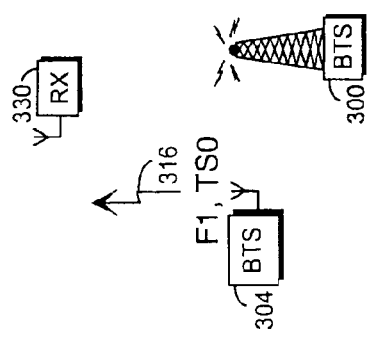
Figure 3E:
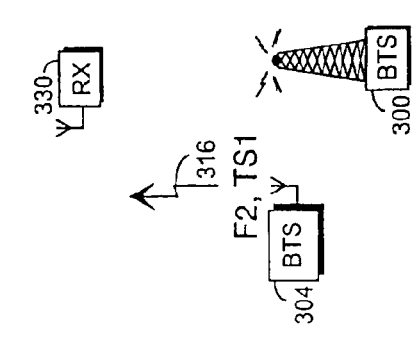

FIGS. 3B to 3G show an example on how the base station 304 of the pico cell 306 selects the physical channels 316 it uses, taking into consideration the interference caused by the base station 300 of the macro cell 302. In FIG. 3B, the controller 102 has directed the pico base station 304 to transmit a physical channel 316 on frequency F1 in time-slot zero. The macro base station 300 is not transmitting anything on the time instant in question, and the receiver box 330 measures that the quality of the channel in question is good.

In FIG. 3C, the pico base station 304 is directed to transmit the physical channel 316 on frequency F1 in time-slot one. The macro base station is, at substantially the same time, transmitting on the same frequency F1 one of its time-slots 322. The receiver box 330 receives on frequency F1 the physical channel 316 of the pico cell 306, which is interfered by the physical channel 322 of the macro cell 302. The measured channel parameter indicates poor quality, and the receiver box 330 transmits a measurement report to the controller 102. The controller 102 determines on the basis of the measurement report that the frequency in question is not suitable for use, and the measurements on said frequency F1 are stopped.

In FIG. 3D, the measurements are continued on frequency F2 on which the pico base station 304 transmits the logical control channel 316 in time-slot zero. The measurements made by the receiver box 330 show good quality, since there is no transmission from the macro base station 300. Correspondingly, in FIG. 3E, time-slot one of frequency F2 shows to be a good physical channel 316.

In FIG. 3F, the pico base station 304 transmits 316 on frequency F2 in time-slot two which is not interfered by the simultaneous transmission 322 of the macro base station 300 on frequency F1.

In FIG. 3G, a situation has been reached where the pico base station 304 has transmitted 316 on all time-slots of frequency F2 except the last, and the receiver box 330 has noted that the quality of all time-slots on frequency F2 is good. In FIG. 3G, the pico base station 304 then transmits 316 on the last time-slot of frequency F2, i.e. time-slot seven. The simultaneous transmission 322 of the macro base station 300 on frequency F3 does not cause interference.

As a result of the testing operation performed in FIGS. 3B to 3G, the controller 102 receives a measurement report, on the basis of which it selects all time-slots of frequency F2 for use in the pico base station 304.

FIGS. 3H and 3I show another example on executing the method in such a manner that the channel configuration of all base stations 304, 308, 312 of the cellular radio network is performed on all base stations 304, 308, 312 simultaneously according to a preliminary channel configuration plan made by the controller 102. In FIG. 3H, the first pico base station 304 is made to transmit a control channel 316 on frequency F1 in time-slot zero, the second pico base station 308 on frequency F2 in time-slot zero 318 and the third pico base station 312 on frequency F3 in time-slot zero 320. FIG. 3H shows that the macro base station 300 also transmits at the same time on frequency F2 in a time-slot 322. The controller 102 determines according to the measurement reports of the receiver boxes 330, 332, 334 that the frequency F2 is reserved and cannot be used in the second pico base station 308.

Therefore, the controller 102 directs the second pico base station to continue testing on frequency F4 in time-slot zero 318, as shown in FIG. 3I. The simultaneous transmission of the macro base station 300 on frequency F2 322 does not cause interference to this transmission 318. The other pico base stations continue testing from the following time-slots onward, i.e. the first pico base station 304 transmits on frequency F1 in time-slot one 316 and the second pico base station 312 on frequency F3 in time-slot one 320. The measurements are continued according to the presented principle until enough good physical channels have been found for the pico base stations 304, 308, 312 to use.

In the following, the telecommunications links of the cellular radio network shown in the example are examined with reference to FIG. 5. The telecommunications links can naturally be implemented in a conventional manner using fixed data transmission lines or micro wave links, for instance. FIG. 5 shows, however, an embodiment which can be used especially in cellular radio networks installed in offices. In such a case, the base stations 304, 308, 312 can be called office base stations. A great advantage of cellular radio networks installed in offices is that a telecommunications network 400 inside a building can be used free of charge for data transfer between the base stations 304, 308, 312 and the base station controller 102. The telecommunications network can be an IP (Internet protocol) network or an ATM (asynchronous transfer mode) network, for instance. When using an IP network, for instance, each network element has its own IP address to which the data packets are addressed. The telecommunications network 400 can also be a wider intranet which links the corporate facilities that are geographically apart to each other.

The office base stations 304, 308, 312 are synchronized with each other, because they are in the same network. If the same controller 102 controls both the office base stations 304, 308, 312 and the macro base station 300, they can all be synchronized with each other, i.e. in a TDMA system, for instance, their time-slots will be transmitted simultaneously. An additional advantage of this is that the base station controller 102 knows which channels of the macro cell 302 can cause interference to the micro or pico cells 306, 310, 314, and the measurements can be made in these situations.

The examples describe the performance of channel configuration in a situation where the macro cell 302 causes interference to the pico or micro cell 306, 310, 314. A situation is also possible, in which the channel configuration of the macro base station 300 shown in FIG. 3A is performed in such a manner that the receiver box 330 or receiver boxes 330, 332, 334 in the macro cell 302 are directed to receive the physical channel 322 transmitted by the macro base station 300. It is then possible to plan the channel configuration on the basis of measurement reports. The presented embodiment operates naturally in several macro cells simultaneously, the essential thing is that there are enough receiver boxes 330, 332, 334 in the macro cell 302.

The implementation of a controller 102 of cellular radio networks installed in offices may differ from the conventional, for instance in that the controller comprises two computers which together provide the functionality of a conventional base station controller as well as the required telecommunications management in the telecommunications network 400.

Let us examine next the structure of the receiver box 330. At its simplest, the receiver box comprises a receiver which can be tuned to receive a desired channel, means for measuring from a signal at least one channel parameter, means for communicating with the controller 102, and a connection to a power source.

The receiver box 330 is preferably connected to the controller 102 through a fixed data network 400. As stated above, the fixed data network 400 can be an IP network in which the receiver box 330 has its own IP address.

Figure 4:
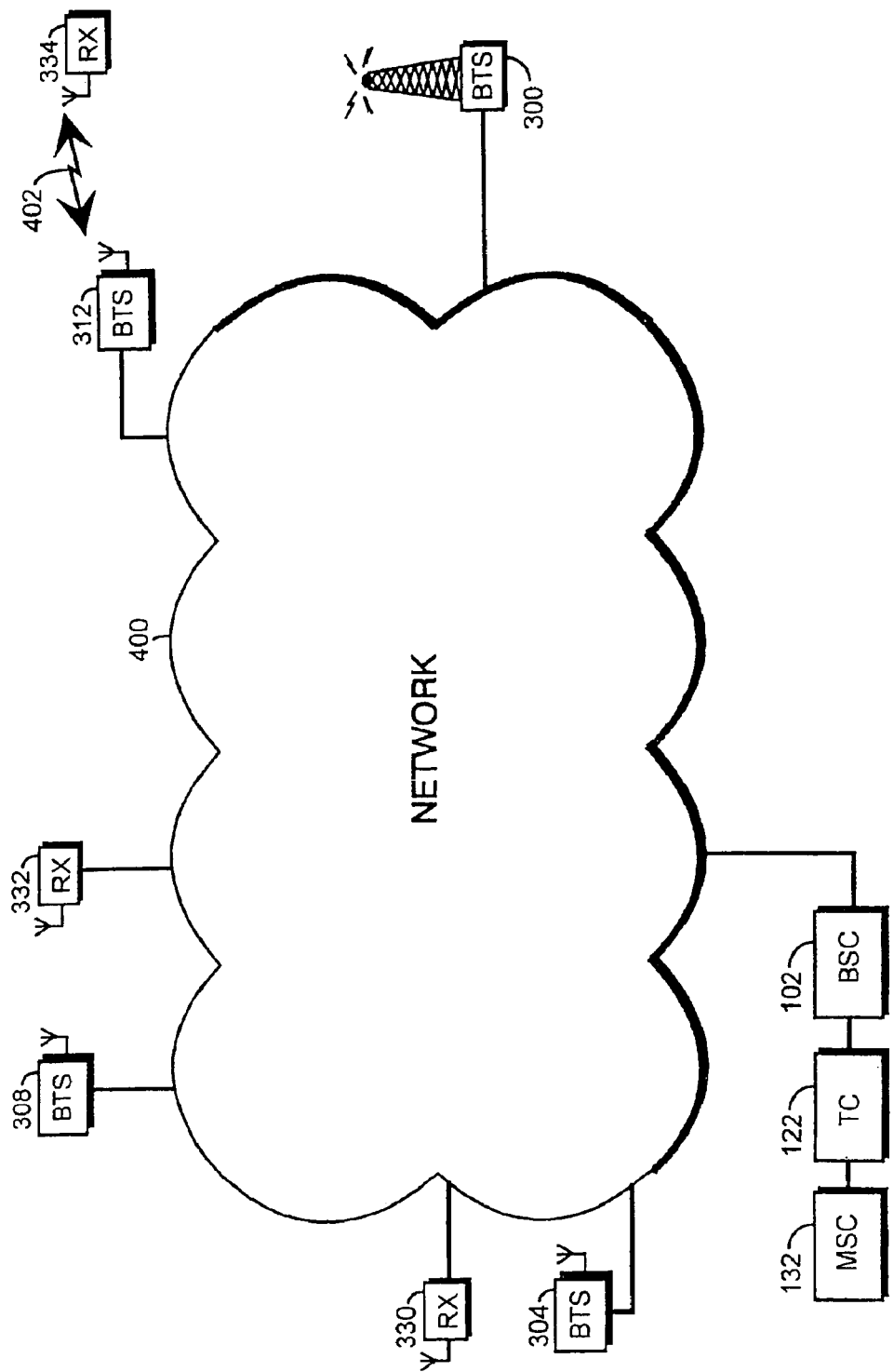
FIG. 4 shows the telecommunications links of a cellular radio network of the invention.

Another possible method for implementing the data transmission link is described in FIG. 4 in which a receiver box 334 is connected to a controller 102 through a wireless bi-directional data transmission link 402. The receiver box 334 then has an actual wireless link 312 to a pico or micro base station 312, for instance, or the wireless link is to a macro base station 300. Data transmission can be implemented using a short message service, for instance.

The receiver box 330 is preferably located in the home, office or business premises of the user of the cellular radio network, depending on the purpose of use. It is also possible to locate the box outdoors as long as a sufficient weather protection is provided. The receiver box 330 should usually be located in a place where operating voltage is easily accessible, even though a battery or a solar cell, for instance, could in special cases be considered as a power source.

In a preferred embodiment, the receiver box 330 uses one after the other various directed antenna beams in the reception of a physical channel to simulate the reception of the physical channel in various geographical locations. A directed antenna beam can be implemented not only by physically directed antennas, but also by phasing an antenna group, whereby the directed antenna beam of the receiver box 330 is formed by calculation by weighting in different ways the signal received through different antenna elements. For instance, in an office room, the receiver box 330 could be installed on one wall, and by generating various directed antenna beams, the range of a physical channel could be simulated in various parts of the room without having to install several receiver boxes 330 in the room.

In a preferred embodiment, the receiver box 330 is capable of receiving physical channels implemented in different ways. Such a receiver box 330 can then receive both a physical channel of a GSM system (frequency—timeslot combination) and that of a UMTS system (frequency—spreading code combination). Further examples are channels implemented on the 900 MHz frequency range of the GSM system and channels implemented on the 1800 MHz frequency range of one of its versions. The receiver box 330 can then be used to assist in performing the channel configuration of cellular radio networks employing a different air interface. If a normal receiver box 330 is, in a way, a device developed from a normal mobile phone, then the special receiver box 330 described herein can be thought to be developed from a dual-band mobile phone or a dual-mode mobile phone.

In a preferred embodiment, the controller 102 comprises means for directing the base station 304, 308, 312 to use various transmission power levels one after the other in transmitting a physical channel 316, 318, 320 to make the range measurement of the channel more accurate. This means that the base station 304 uses one after the other different transmission power levels to transmit the physical channel, for instance so that the physical channel is first transmitted at full level for 20 seconds, and then at the next smaller level for 20 seconds, and this is continued until the smallest possible level has been used. The receiver box 330 measures each transmission, and on the basis of the measurements, it is then possible to estimate the range of the physical channel more accurately than when using just one transmission power level. The number of transmission power levels selected depends on each situation. The measurements can also be made at several stages: first a rough measurement on all cells at a certain transmission power level and then more accurate measurements for any borderline cases at several transmission power levels. When performing channel configuration, one physical channel parameter can also be a recommended transmission power level which is always used at least at the beginning of the connection.

The network element of the cellular radio network comprises at least one fixed receiver box 330 which comprises means for receiving control commands from the controller 102, means for measuring at least one channel parameter representing the properties of at least one physical channel 316 transmitted by the base station 304, and means for transmitting a measurement report on measurements performed by the receiver box 330 to the controller 102. The controller 102 of the network element comprises means for directing the base station 304 to transmit a logical control channel on at least one physical channel 316 allowed for the cellular radio network, means for directing the fixed receiver box 330 to receive at least one physical channel 316 transmitted by the base station 304, means for selecting on the basis of at least one measurement report at least one physical channel 316 enabling good range, and means for directing the base station 304 to use at least one physical channel 316 enabling good range. Sections of the network element of the invention are preferably implemented by software run in a processor. Sections of the network element of the invention can also be implemented by hardware, for instance by asic (application specific integrated circuit) or by a separate logic.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for performing channel configuration of a base station in a cellular radio network, the method comprising:
    directing by a controller the base station to transmit a logical control channel on at least one physical channel allowed for the cellular radio network;
    directing a fixed receiver box located in a cell associated with the base station but apart from the base station to receive at least one physical channel transmitted by the base station and to measure at least one channel parameter representing the properties of said at least one physical channel including said logical control channel, wherein the receiver box has its own IP address for receiving directions;
    transmitting a measurement report on the measurements performed by the receiver box to the controller;
    selecting by the controller on the basis of at least one measurement report at least one physical channel enabling good range; and
    directing the base station to use at least one physical channel enabling good range.

2. A method as claimed in claim 1, wherein the receiver box is connected to the controller through a fixed data network.

3. A method as claimed in claim 2, wherein the fixed data network is an IP (Internet protocol) network.

4. A method as claimed in claim 1, wherein the receiver box is connected to the controller through a wireless bi-directional data transmission link.

5. A method as claimed in claim 1, wherein the receiver box is controlled in real time.

6. A method as claimed in claim 1, wherein the receiver box uses one after the other various directed antenna beams in receiving a physical channel to simulate the reception of the physical channel in various geographical locations.

7. A method as claimed in claim 1, wherein the receiver box is capable of receiving physical channels implemented in different ways.

8. A method as claimed in claim 1, wherein the base station uses one after the other various transmission power levels in transmitting a physical channel to improve the accuracy of the range measurement of the physical channel.

9. A method as claimed in claim 1, wherein the channel configuration is performed when building the cellular radio network.

10. A method as claimed in claim 1, wherein the channel configuration is performed at regular intervals.

11. A method as claimed in claim 1, wherein the base station forms a pico cell or a micro cell.

12. A method as claimed in claim 11, wherein the base station is an office base station.

13. A method as claimed in claim 1, wherein the base station forms a macro cell.

14. A method as claimed in claim 1, wherein the channel configuration of all base stations of the cellular radio network is performed on all base stations simultaneously according to a preliminary channel configuration plan made by the controller.

15. A method as claimed in claim 1, wherein the physical channel is a time-slot of a radio frequency, and the logical control channel is directed to be transmitted at its time through each time-slot of said frequency.

16. A method as claimed in claim 1, wherein the logical control channel is a BCCH (broadcast control channel).

17. A method as claimed in claim 1, wherein the receiver box is placed in the home, office or business premises of the user of the cellular radio network.

18. A method as claimed in claim 1, wherein the receiver box is capable of receiving physical channels implemented in different ways.

19. A network part of a cellular radio network, comprising:
   at least one base station;
   a controller controlling the base station; and
   at least one fixed receiver box located in a cell associated with the base station but apart from the base station and which comprises means for receiving control commands from the controller, means for measuring at least one channel parameter representing the properties of at least one physical channel including said logical control channel transmitted by the base station, and means for transmitting a measurement report on measurements performed by the receiver box to the controller, and
   the controller comprises means for directing the base station to transmit a logical control channel on at least one physical channel allowed for the cellular radio network, means for directing the fixed receiver box to receive at least one physical channel transmitted by the base station, means for selecting on the basis of at least one measurement report at least one physical channel enabling good range, and means for directing the base station to use at least one physical channel enabling good range,
   wherein the receiver box has its own IP address for receiving directions.

20. A network part as claimed in claim 19, wherein the receiver box comprises means for establishing a data transmission link to the controller through a fixed data network.

21. A network part as claimed in claim 20, wherein the fixed data network is an IP (Internet protocol) network.

22. A network part as claimed in claim 19, wherein the receiver box is connected to the controller through a wireless bi-directional data transmission link.

23. A network part as claimed in claim 19, wherein the means of the receiver box for receiving control commands from the controller receive them in real-time.

24. A network part as claimed in claim 19, wherein the receiver box comprises means to implement a directed antenna beam in reception, and means for using one after the other various directed antenna beams in receiving a physical channel to simulate the reception of the physical channel in various geographical locations.

25. A network part as claimed in claim 19, wherein the receiver box comprises means for receiving physical channels implemented in different ways.

26. A network part as claimed in claim 19, wherein the controller comprises means for directing the base station to use one after the other various transmission power levels in transmitting a physical channel to improve the accuracy of the range measurement of the physical channel.

27. A network part as claimed in claim 19, wherein the channel configuration of the base station is performed when building the cellular radio network.

28. A network part as claimed in claim 19, wherein the channel configuration of the base station is performed at regular intervals.

29. A network part as claimed in claim 19, wherein the base station forms a pico cell or a micro cell.

30. A network part as claimed in claim 29, wherein the base station is an office base station.

31. A network part as claimed in claim 19, wherein the base station forms a macro cell.

32. A network part as claimed in claim 19, wherein the channel configuration of all base stations in the cellular radio network is performed on all base stations simultaneously according to a preliminary channel configuration plan made by the controller.

33. A network part as claimed in claim 19, wherein the physical channel is a time-slot of a radio frequency, and the logical control channel is directed to be transmitted at its time through each time-slot of said frequency.

34. A network part as claimed in claim 19, wherein the logical control channel is a BCCH (broadcast control channel).

35. A network part as claimed in claim 19, wherein the receiver box is placed in the home, office or business premises of the user of the cellular radio network.

36. A method for performing channel configuration of a base station in a cellular radio network, the method comprising:
   directing by a controller the base station to transmit a logical control channel on at least one physical channel allowed for the cellular radio network;
   directing a fixed receiver box to receive at least one physical channel transmitted by the base station and to measure at least one channel parameter representing the properties of said at least one physical channel;
   transmitting a measurement report on the measurements performed by the receiver box to the controller;
   selecting by the controller on the basis of at least one measurement report at least one physical channel enabling good range; and
   directing the base station to use at least one physical channel enabling good range,
   wherein the receiver box has its own IP address for receiving directions, and
   wherein the receiver box uses one after the other various directed antenna beams in receiving a physical channel to simulate the reception of the physical channel in various geographical locations.

* * * * *